(12) United States Patent  
Kim (10) Patent No.: US 11,712,116 B1  
(45) Date of Patent: Aug. 1, 2023

(54) DISPLAY PANEL FIXING APPARATUS

(71) Applicant: GMTRON Co., Ltd., Seoul (KR)

(72) Inventor: Nam Sun Kim, Incheon (KR)

(73) Assignee: GMTRON CO., LTD., Seoul (KR)

( * ) Notice: Subject to any disclaimer, the term of this patent is extended or adjusted under 35 U.S.C. 154(b) by 0 days.

(21) Appl. No.: 17/872,779

(22) Filed: Jul. 25, 2022

(51) Int. Cl.  
*A47B 97/00* (2006.01)  
*F16M 11/04* (2006.01)  
*F16M 11/10* (2006.01)

(52) U.S. Cl.  
CPC ......... *A47B 97/001* (2013.01); *F16M 11/046* (2013.01); *F16M 11/048* (2013.01); *F16M 11/10* (2013.01); *F16M 2200/061* (2013.01)

(58) Field of Classification Search  
USPC ....... 248/917, 918, 919, 920, 921, 922, 923, 248/121, 122.1, 123.11, 123.2, 124.1  
See application file for complete search history.

(56) References Cited

U.S. PATENT DOCUMENTS

| | | | | |
|---|---|---|---|---|
| 2011/0198460 A1* | 8/2011 | Stifal | ................. | A47B 97/001 248/201 |
| 2013/0146727 A1* | 6/2013 | Oh | ................... | F16M 13/02 248/277.1 |
| 2017/0059087 A1* | 3/2017 | Lam | .................. | F16M 11/2092 |
| 2019/0128472 A1* | 5/2019 | Kahn | ..................... | F16M 11/06 |
| 2020/0208774 A1* | 7/2020 | Pei | ........................ | H05K 5/0204 |
| 2022/0240676 A1* | 8/2022 | Purton | ................ | F16M 11/048 |

FOREIGN PATENT DOCUMENTS

KR 10-1738926 B1 5/2017

* cited by examiner

*Primary Examiner* — Alfred J Wujciak (74) *Attorney, Agent, or Firm* — Rabin & Berdo, P.C.

(57) ABSTRACT

The present disclosure relates to a display panel fixing apparatus that adjusts a separation distance between first and second support frames by folding a link while an adjustment member of a gap adjustment unit is vertically moved, adjusts a height of a height adjustment unit in proportion to an exposure distance of a height adjustment bolt by vertically moving the height adjustment bolt, adjusts angles of upper end lower ends of a fixing frame while vertically moving and rotating angle adjustment members installed at upper and lower ends using a vertical movement adjuster of an angle adjustment device, and thus can individually finely adjust a separation distance between a display and a base frame, an installation height of a display, and tilting angles of upper and lower ends of the display.

8 Claims, 9 Drawing Sheets

DISPLAY PANEL FIXING APPARATUS

BACKGROUND

1. Field of the Invention

The present disclosure relates to a display panel fixing apparatus, and more particularly, to a display panel fixing apparatus that adjusts upper and lower angles of a display installed on a fixing frame by adjusting upper and lower angles of the fixing frame while vertically moving and rotating angle adjustment members installed at upper and lower ends of the fixing frame using vertical movement adjusters of the angle adjustment members.

2. Discussion of Related Art

In general, display panel fixing apparatuses fixedly install display panels capable of outputting images (liquid crystal displays (LCD) panels, plasma display panels (PDPs), light emitting diode (LED) panels, or the like) used for televisions (TVs), computer monitors, electronic blackboards, or electronic boards, on structures such as walls, and thus the display panels serve to be used smoothly for exhibition, education, and publicity so that a large number of people may watch the images at the same time.

The display panel fixing apparatus includes a fixing frame fixed to a wall surface and a front-rear distance adjustment device that is installed in front of the fixing frame to be horizontally movable in a front-rear direction so that a display is spaced a predetermined distance from the wall surface or the structure.

Patent Document 1 relates to a display panel fixing apparatus for multi-vision according to the related art, and more particularly, to a display panel fixing apparatus including a base frame fixedly installed on a structure, a front-rear control unit that is installed on a front surface of the base frame and adjusts a separation distance between a display and the base frame while moving forward or rearward, an up-down adjustment unit that is fixedly caught on upper and lower ends of the front-rear adjustment unit and adjusts a height of the display by being finely adjusted upward or downward, and a slope adjustment unit that is to be tilted and installed at a front end of the up-down adjustment unit and adjusts a slope of the display.

Here, the front-rear adjustment unit includes a first support frame fixedly installed on the front surface of the base frame, a second support frame located in front of the first support frame, links connecting the first and second support frames in an X shape, and an adjustment member installed at a lower end of the second support frame and connected to the link.

In this case, when the second support frame is moved toward the first support frame or is spaced apart from the first support frame, central portions of the links are rotated to cross each other while the adjustment member moves upward or downward, a gap between the links is adjusted, and thus a separation distance between the first support frame and the second support frame is adjusted.

Further, as an up-down adjustment bolt of the up-down adjustment unit is rotated, the up-down adjustment bolt comes into close contact with an upper surface of a holding frame, and thus the height of the display is adjusted by the holding frame whose height is adjusted.

Further, as a fine slope adjustment bolt of the slope adjustment unit is rotated, the fine slope adjustment bolt comes into close contact with the front surface of the holding frame, and thus slopes of an upper end and a lower end, which is operated to be rotated about a central portion, of the fixing frame are adjusted to be proportional to each other in opposite directions. Accordingly, the slopes of upper and lower ends of the display are adjusted in proportional to each other.

However, in Patent Document 1 described above, as the fixing frame is rotated about the central portion, the upper end and the lower end of the fixing frame are rotated to be proportional in opposite directions. When rotation angles of the upper end or the lower end are adjusted, the slopes of the upper end and the lower end of the display are simultaneously adjusted in opposite directions. Thus, there is inconvenience in that, due to the simultaneous changes of the slopes of the upper end and the lower end of the fixing frame, an angle of the fixing frame should be adjusted while the slopes of the upper simultaneously checking end and the lower end of the fixing frame. When the upper end of the fixing frame is adjusted or the lower end of the fixing frame is adjusted, the upper end or the lower end of the fixing frame, which is opposite to the adjusted lower end or the adjusted upper end, is relatively more exposed or inserted, and thus it is difficult to fix the display in an upright state. In particular, it is impossible to adjust the upper and lower ends of the fixing frame individually, and thus fine adjustment is difficult. Accordingly, there is a problem in that it is difficult to adjust the angle of the display, and at the same time, the reliability of a product is lowered.

RELATED ART DOCUMENT

[Patent Document]
(Patent Document 1) KR 10-1738926 B1

SUMMARY OF THE INVENTION

The present disclosure is directed to providing a display panel fixing apparatus in which first support frames are provided on both sides of a front surface of a base frame, second support frames are formed in front of the first support frames, the first and second support frames are connected to each other through a link, a gap adjustment unit for connecting the link and an adjustment member is formed, a catching bracket caught on and fixed to an upper end of a horizontal frame and a support bracket below the catching bracket are formed, height adjustment units through which a height adjustment bolt and a first fixing bolt are fastened to upper and lower ends of the catching bracket and the support bracket are formed, fixing frames rotatably installed at upper and lower ends of the height adjustment unit and fixing a display are provided, angle adjustment devices including angle adjustment members vertically moved and rotated by vertical movement adjusters are provided at upper and lower ends between the fixing frame and the height adjustment unit, a separation distance between the first and second support frames is adjusted by folding the link while the adjustment member of the gap adjustment unit is vertically moved, a height of the height adjustment units is adjusted to be proportional to an exposure distance of the height adjustment bolt by vertically moving the height adjustment bolt, angles of the upper and lower ends of the fixing frame are individually adjusted while vertically moving and rotating the angle adjustment members installed at the upper and lower ends using the vertical movement adjusters of the angle adjustment devices, and thus a separation distance between the display and the base frame, an installation height of the display, and tilting angles of upper and lower ends of the display can be finely adjusted.

According to an aspect of the present disclosure, there is provided a display panel fixing apparatus including a base frame fixedly installed on a structure, a gap adjustment unit including a pair of first support frames that are symmetrical on both sides of a front surface of the base frame, a pair of second support frames that are formed at a front side opposite to the first support frames to correspond to the first support frames and are connected by a horizontal frame), links that are formed between the first support frames and the second frames in an X shape to be foldable and adjust a separation distance between the first support frames and the second support frames, and adjustment members that are connected to the links at lower ends of the second support frames and are vertically moved to adjust a folding gap between the links, a height adjustment unit having a plate shape and including a catching bracket that is formed on one surface thereof to be caught on and fixed to an upper end of the horizontal frame, a support bracket that supports a lower end of the horizontal frame below the catching bracket, a height adjustment bolt that is fastened through an upper end of the catching bracket and is in close contact with the upper end of the horizontal frame, and a first fixing bolt that is fastened through a lower end of the support bracket and is in close contact with the lower end of the horizontal frame, and an angle adjustment device having a single plate shape and including a fixing frame that is rotatably installed at upper and lower ends of one surface of the height adjustment unit and fixes a display to a front surface thereof, angle adjustment members that are vertically moved and rotatably installed at upper and lower ends between the fixing frame and the height adjustment unit and adjust tilting angles of the upper and lower ends of the fixing frame, and vertical movement adjusters that are installed to be connected to the angle adjustment members at upper and lower ends of the height adjustment unit and force the vertical movement of the angle adjustment member.

The gap adjustment unit may include long holes which extend to be long and pass through facing inner wall surfaces of lower ends of the first support frame in a longitudinal direction, and the link may include a first link that has one end rotatably installed at an upper end of the first support frame and the other end rotatably installed at the adjustment member and pulls or pushes the second support frame while rotating about a central portion through the adjustment member that is vertically moved, a second link that has one end rotatably installed at an upper end of the second support frame, extends to be long between the one end and the other end in a longitudinal direction, is connected by a connecting rod slidably coupled to the long hole, and pulls or pushes the second support frame while rotating about a central portion by the connecting rod that is operated to be vertically moved along the long hole, and a rotary shaft that is fastened to pass through central portions of the first link and the second link and guides the first link and the second link so that the first link and the second link are rotated about the central portions.

The adjustment member of the gap adjustment unit may include a vertical movement rod formed at a lower end of the second support frame in an upright state, and a vertical movement block that is slidably coupled to the vertical movement rod and is vertically moved along the vertical movement rod to adjust a folding gap of the link.

The base frame may further include a pair of second fixing bolts that are fixedly installed to be symmetrical on both sides of the front surface of the base frame to be located above the first support frame, are fastened in an upright state to be vertically movable in a spiral manner, and are vertically moved, and the second support frame may further include an inclination bracket that extends downward from an upper end toward a front surface thereof and is pressed by the second fixing bolts to fix the second support frame to the first support frame.

The second support frame of the gap adjustment unit further may include a distance limitation bolt that is fastened to a lower end thereof in a spiral manner in a horizontal state to face the base frame, is operated in a front-rear direction so that an end thereof is in close contact with the front surface of the base frame, and prevents the second support frame from approaching within a predetermined distance or less from the first support frame.

The height adjustment unit further may include a side bolt that is fastened to one surface of the catching bracket perpendicular to the height adjustment bolt in a spiral manner to face the horizontal frame, is horizontally moved in close contact with a side surface of the horizontal frame, and fixes an upper end of the height adjustment unit to the horizontal frame, and the first fixing bolt may be vertically moved, may be in close contact with a bottom surface of the horizontal frame, and may fix a lower end of the height adjustment unit to the horizontal frame.

The height adjustment bolt may be vertically moved, may be in close contact with an upper surface of the horizontal frame, and may adjust a height so that the height adjustment unit is spaced a predetermined distance from an upper portion of the horizontal frame, and may further include a driving ball that is in close contact with the upper surface of the horizontal frame at an end thereof and guides the height adjustment unit so that the height adjustment unit slides in a longitudinal direction of the horizontal frame.

The height adjustment unit may include a pair of vertical movement guide holes formed to be symmetrical at upper and lower ends of one surface thereof and an angle adjustment hole formed to pass through the one surface at a lower end of the vertical movement guide hole in an arcuate shape in a direction perpendicular to the vertical movement guide hole, and the angle adjustment member may include a rotation plate that has a plate shape and includes a first rotary shaft formed on one surface thereof to be rotatably connected to the fixing frame, a second rotary shaft that is formed to cross the first rotary shaft on the other surface opposite to the first rotary shaft and is rotatably installed on one surface of the height adjustment unit, and an angle adjustment shaft that is inserted into the angle adjustment hole at an upper end of the second rotary shaft, is moved along the angle adjustment hole, and adjusts an angle of an upper end or a lower end of the fixing frame, and a vertical movement plate that has a plate shape and includes a fastening hole that is located between the height adjustment unit and the rotation plate and allows fastening of the vertical movement adjuster at an upper end thereof, a vertical movement guide formed on one surface thereof to be inserted into the vertical movement guide hole 300a of the height adjustment unit, a diagonal hole that is formed to pass through a lower portion of the vertical movement guide toward a diagonal direction and communicates with the angle adjustment hole to allow the angle adjustment shaft to pass therethrough, and an upright hole that is formed to pass through a lower portion of the diagonal hole in an upright state, allows the second rotary shaft to pass therethrough, and is operated to be vertically moved along the second rotary shaft, wherein the vertical movement plate is vertically moved by the vertical movement adjuster to adjust a rotation angle of the rotation plate.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in more detail with reference to the accompanying drawings.

Referring to FIGS. 1 to 9, a base frame 100 is fixedly installed on a structure.

The base frame 100 allows a gap adjustment unit 200, a height adjustment unit 300, and an angle adjustment device 400 to be installed in front thereof.

The base frame 100 supports the loads of the gap adjustment unit 200, the height adjustment unit 300, the angle adjustment device 400, and a display D and allows the display D installed in front of the angle adjustment device 400 to float in the air.

It is preferable that the base frame 100 is fixedly installed on a structure (for example, a wall surface) by an anchor bolt (not illustrated) and is maintained in close contact with the structure.

Another frame 100 comes into close contact with upper and lower ends thereof or left and right surfaces of the base frame 100, and the base frames 100 may be connected by a fastening member (not illustrated).

The base frame 100 may be formed in a hollow tubular shape, and the plurality of base frames 100 may be connected in a longitudinal direction by a connection member (not illustrated) entering a hollow.

The base frame 100 further includes a pair of second fixing bolts 101 that are located above a first support frame 201, fixedly installed to be symmetrical on both sides of the front surface of the first support frame 201, fastened in an upright state to be vertically moved in a spiral manner, and operated to be vertically moved.

While the second fixing bolts 101 are vertically elevated in spiral manner, an inclination bracket 202b of a second support frame 202 is pushed and pressed so that the second support frame 202 is fixed in close contact with the first support frame 201.

It is preferable that the second fixing bolts 101 push and press an inclination surface of the inclination bracket 202b.

Figure 1:
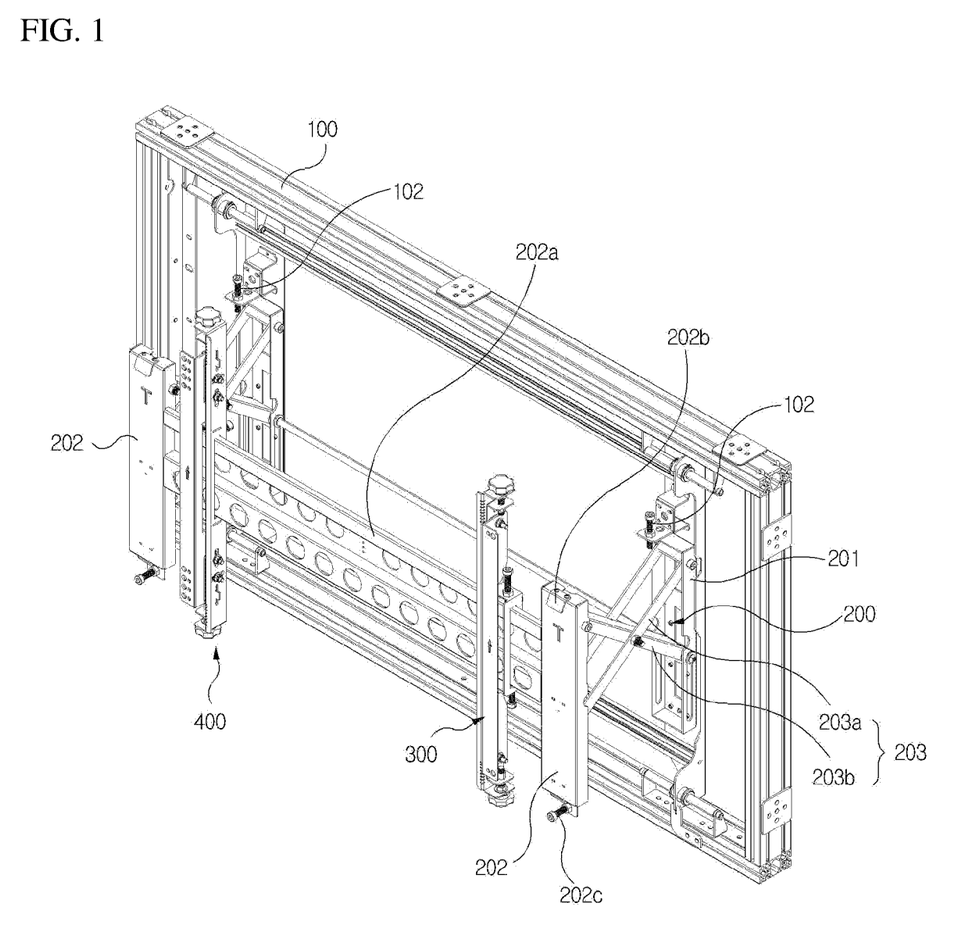
FIG. 1 is a perspective view illustrating a display panel fixing apparatus according to the present disclosure.
Figure 2:
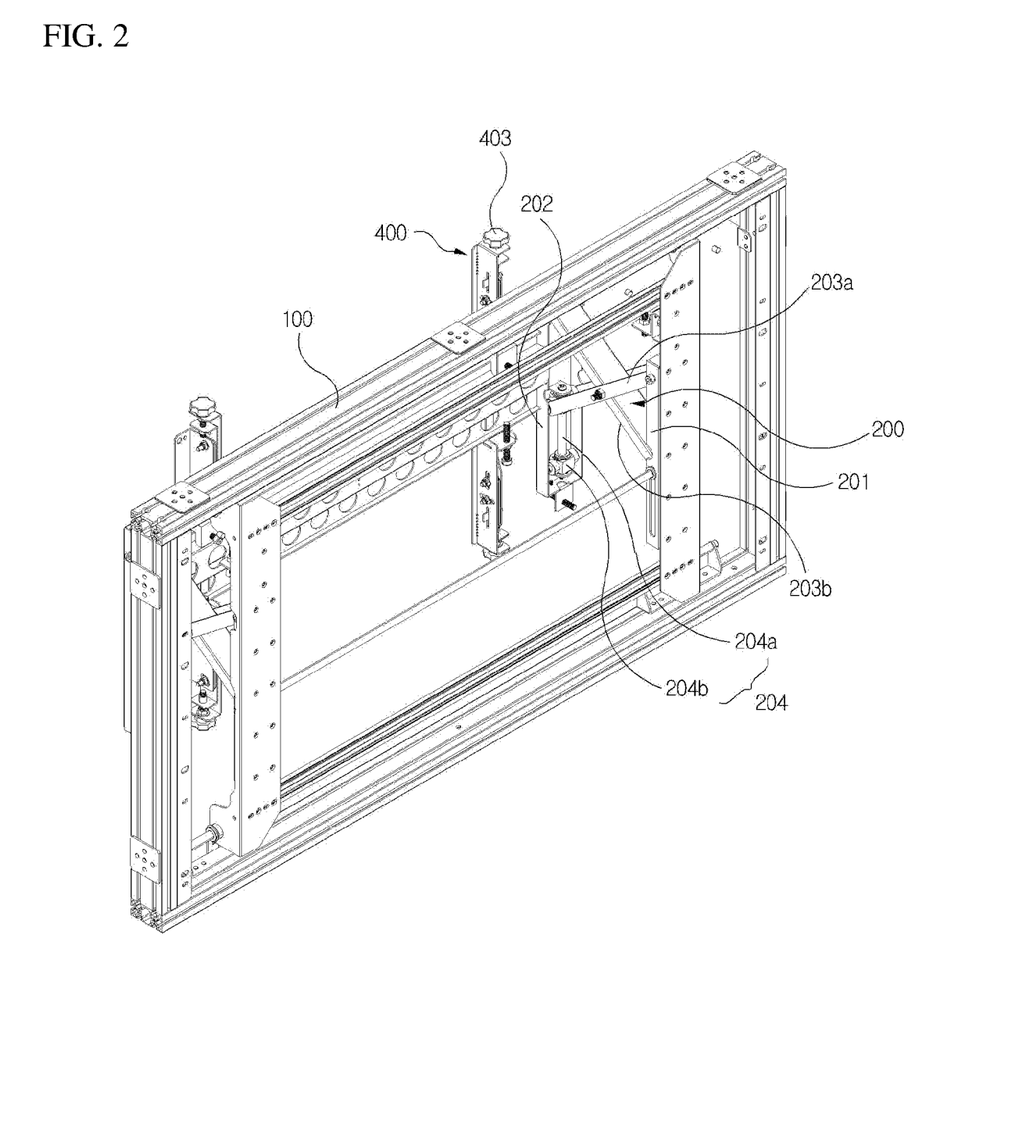
FIG. 2 is a rear perspective view of FIG. 1.
Figure 3:
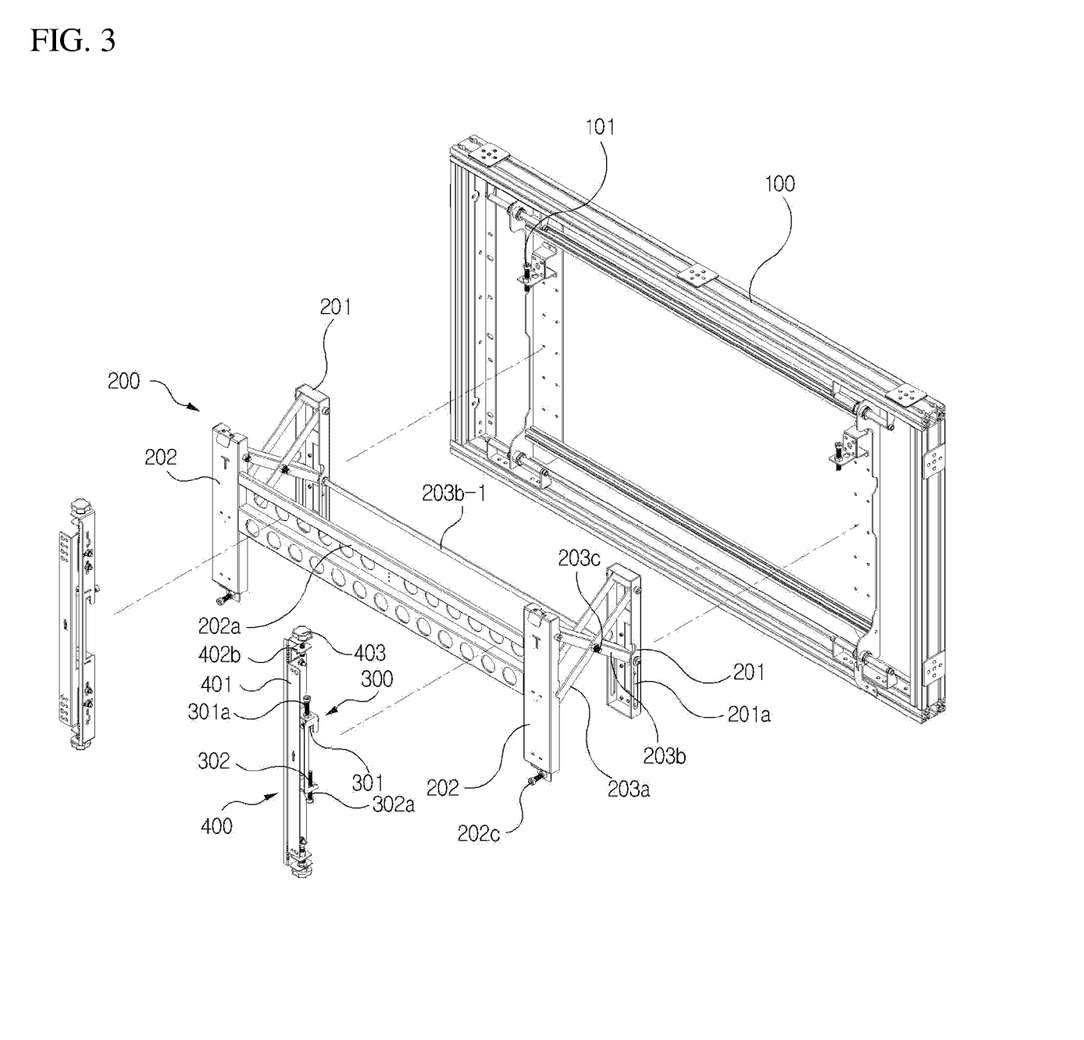
FIG. 3 is an exploded perspective view illustrating the display panel fixing apparatus according to the present disclosure.
Figure 4:
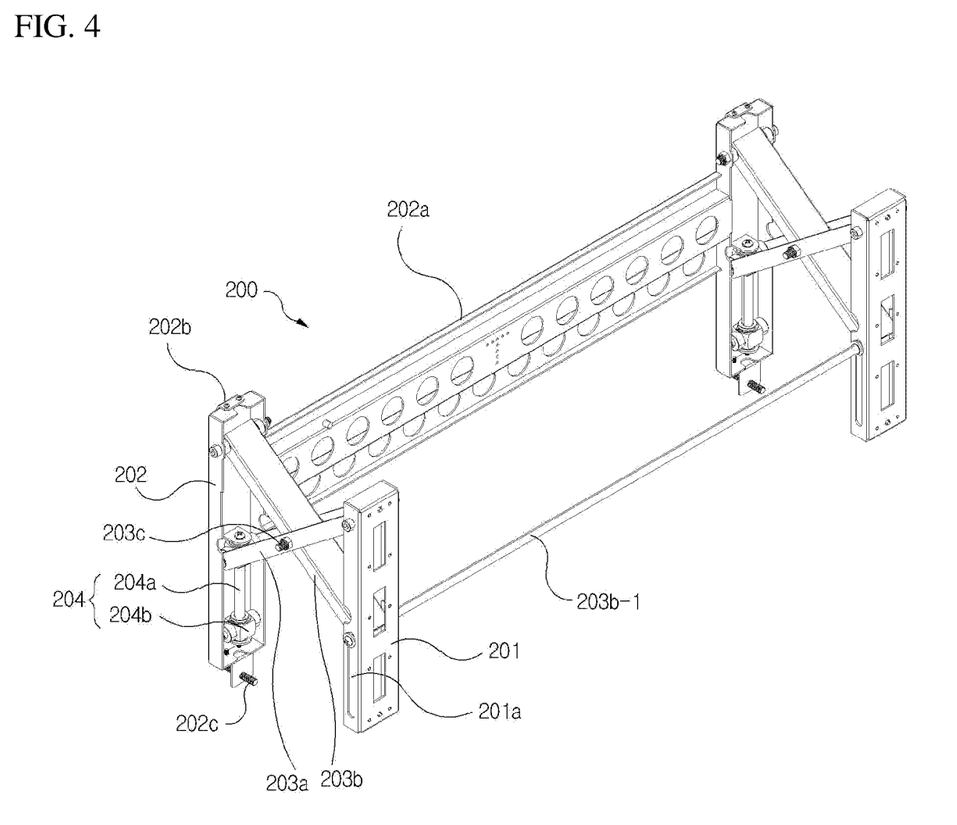
FIG. 4 is a perspective view illustrating a gap adjustment unit of the display panel fixing apparatus according to the present disclosure.

The gap adjustment unit 200 includes a pair of first support frames 201 symmetrical on both sides of the front surface of the base frame 100, a pair of second support frames 202 that are formed on front sides facing the first support frames 201 to correspond to the first support frames 201 and are connected by a horizontal frame 202a, links 203 that are formed between the first support frames 201 and the second support frames 202 in an X shape to be foldable and adjust a separation distance between the first support frames 201 and the second support frames 202, and adjustment members 204 that are connected to the links 203 at lower ends of the second support frames 202 and operated to be vertically moved to adjust a folding gap between the links 203.

The gap adjustment unit 200 moves the angle adjustment device 400 in a front-rear direction so that the display D installed on the angle adjustment device 400 is spaced a predetermined distance from the base frame 100.

It is preferable that the first support frame 201 has a shape formed to be symmetrical to the second support frame 202.

The first support frame 201 is fixedly installed on the base frame 100 and guides the second support frame 202 to move in the front-rear direction while supporting the link 203 to be folded.

The first support frame 201 includes long holes 201a which are long and pass through inner wall surfaces of lower ends facing each other in a longitudinal direction.

The long hole 201a guides the upward or downward movement of a connecting rod 203b-1 of a second link 203b.

It is preferable that the length of the long hole 201a is formed to be proportional to the length of a vertical movement rod 204a of the adjustment member 204.

The second support frame 202 is moved in the front-rear direction by the link 203 in front of the first support frame 201 so that the display D becomes closer to the base frame 100 or is spaced a predetermined distance from the base frame 100.

It is preferable that the second support frame 202 is installed at the same height as the first support frame 201 and moved in the front-rear direction.

The second support frame 202 becomes closer to the first support frame 201 or is spaced a predetermined distance from the first support fame 201 by the link 203 to be folded.

The separation distance between the second support frame 202 and the first support frame 201 is formed to be proportional to a folding gap of the link 203.

The second support frame 202 further includes an inclination bracket 202b that is formed to extend downward from an upper end thereof in a forward direction and is pressed by the second fixing bolt 101 to fix the second support frame 202 to the front of the first support frame 201.

The inclination bracket 202b is pushed and pressed against the second fixing bolt 101 of the base frame 100 to prevent the second support frame 202 from moving forward.

The second support frame 202 of the gap adjustment unit 200 further includes a distance limitation bolt 202c that is fastened to a lower end thereof in a spiral manner in a horizontal state to face the base frame 100, is operated in the front-rear direction so that an end thereof is in close contact with the front surface of the base frame 100, and prevents the second support frame 202 from approaching within a predetermined distance or less from the first support frame 201.

The distance limitation bolt 202c is exposed to a rear end of the second support frame 202, is in close contact with the base frame 100 at an end thereof, and maintains the second support frame 202 in a state of being spaced apart from the first support frame 201 to be proportional to the length exposed to the rear end of the second support frame 202.

It is preferable that the distance limitation bolt 202c is manually adjusted by a user.

The link 203 is folded while rotating about a central portion thereof and moves the second support frame 202 in the front-rear direction.

The link 203 includes a first link 203a that has one end rotatably installed at an upper end of the first support frame 201 and the other end rotatably installed in the adjustment member 204 and pulls or pushes the second support frame 202 while rotating about a central portion by the adjustment member 204 that is vertically moved, a second link 203b that has one end rotatably installed at an upper end of the second support frame 202, extends to be long between the one end and the other end in a longitudinal direction, is connected by the connecting rod 203b-1 slidably coupled to the long hole 201a, and pulls or pushes the second support frame 202 while rotating about a central portion by the connecting rod 203b-1 that is operated to be vertically moved along the long hole 201a, and a rotary shaft 203c that is fastened to pass through central portions of the first link 203a and the second link 203b and guides the first and second links 203a and 203b so that the first and second links 203a and 203b are rotated about the central portions.

The first link 203a moves the second frame 202 in the front-rear direction while the other end thereof is vertically moved by the adjustment member 204 and the central portion thereof is rotated about the rotary shaft 203c.

The second link 203b moves the second support frame 202 in the front-rear direction while the other end thereof is vertically moved by the connecting rod 203b-1 vertically moved along the long hole 201a and the central portion thereof is rotated about the rotary shaft 203c.

The first link 203a and the second link 203b are formed in an X shape to cross each other and are folded.

While the connecting rod 203b-1 is vertically moved by the second support frame 202 moved in the front-rear direction, the connecting rod 203b-1 guides the second link 203b such that the second link 203b is rotated about the rotary shaft 203c.

The rotary shaft 203c guides the first link 203a and the second link 203bn such that the first link 203a and the second link 203b are rotated about the central portions.

While the adjustment member 204 is vertically moved by the second support frame 202 moved in the front-rear direction, the adjustment member 204 guides the first link 203a such that the first link 203a is rotated about the rotary shaft 203c.

It is preferable that the adjustment member 204 is installed inside a lower end of the second support frame 202.

The adjustment member 204 of the gap adjustment unit 200 includes a vertical movement rod 204a formed in an upright state at a lower end of the second support frame 202 and a vertical movement block 204b that is slidably coupled to the vertical movement rod 204a and vertically moved along the vertical movement rod 204a to adjust a folding gap of the link 203.

The length of the vertical movement rod 204a is formed in proportion to the length of the long hole 201a.

The vertical movement rod 204 protrudes in an upright state from a bottom surface of the second support frame 202.

The vertical movement block 204b allows the other end of the first support frame 201 to be rotatably coupled and is vertically moved along the vertical movement rod 204a so that the first link 203a is rotated about the central portion.

Figure 7:
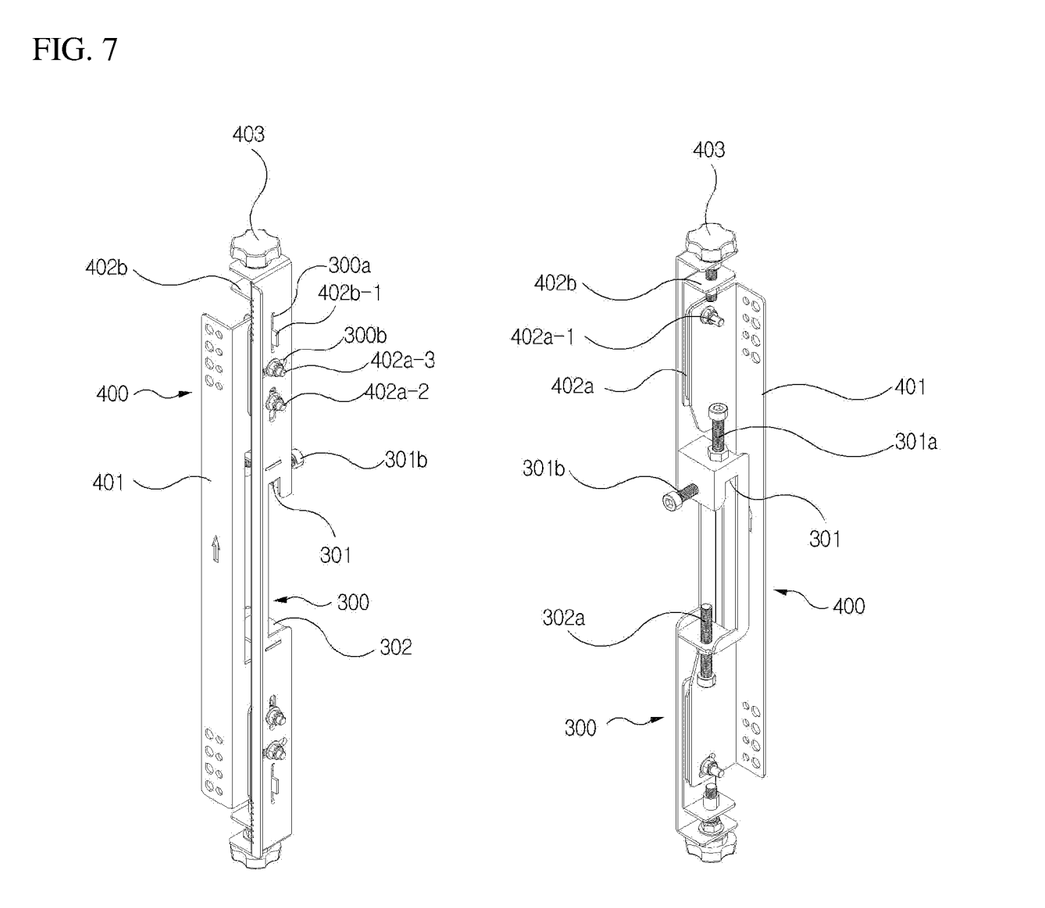
FIG. 7 is a perspective view illustrating a height adjustment unit and an angle adjustment device of the display panel fixing apparatus according to the present disclosure.
Figure 8:
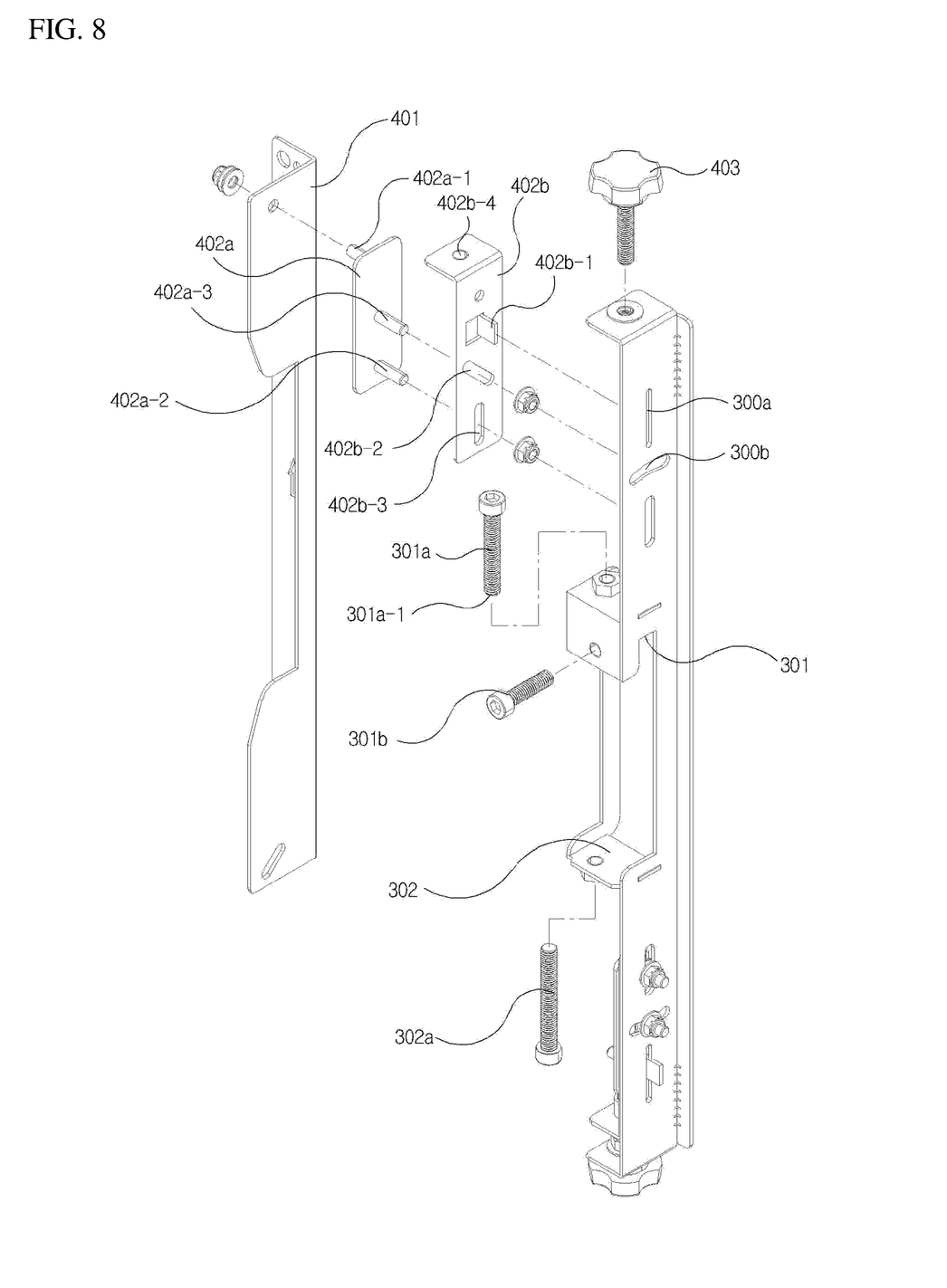
FIG. 8 is an exploded perspective view of the height adjustment unit and the angle adjustment device of the display panel fixing apparatus according to the present disclosure.

The height adjustment unit 300 includes a catching bracket 301 having a plate shape and formed on one surface thereof to be caught on and fixed to an upper end of the horizontal frame 202a, a support bracket 302 that supports a lower end of the horizontal frame 202a below the catching bracket 301, a height adjustment bolt 301a that is fastened to pass through an upper end of the catching bracket 301 and is in close contact with the upper end of the horizontal frame 202a, and a first fixing bolt 302a that is fastened to pass through a lower end of the support bracket 302 and is in close contact with the lower end of the horizontal frame 202a.

The catching bracket 301 is caught on and fixed to the upper end of the horizontal frame 202a and fixes the height adjustment unit 300 to the horizontal frame 202a.

It is preferable that the catching bracket 301 is caught on and fixed to the upper end of the horizontal frame 202a in a "⊓" shape.

The height adjustment bolt 301a is vertically moved and is in close contact with an upper surface of the horizontal frame 202a to adjust the height so that the height adjustment unit 300 is spaced a predetermined distance from an upper portion of the horizontal frame 202a.

The height adjustment bolt 301a is exposed below the catching bracket 301 and separates the height adjustment unit 300 upward from the horizontal frame 202a in proportion to an exposure length thereof.

The height adjustment bolt 301a further includes a driving ball 301a-1 that is in close contact with the upper surface of the horizontal frame 202 at an end thereof and guides the height adjustment unit 300 so that the height adjustment unit 300 slides in a longitudinal direction of the horizontal frame 202a.

The driving ball 301a-1 is rotated in place while rubbing against the upper surface of the horizontal frame 202a so that the height adjustment unit 300 moves in a left-right direction on the horizontal frame 202a.

The height adjustment unit 300 further includes a side bolt 301b that is fastened to one surface of the catching bracket 301 perpendicular to the height adjustment bolt 301a in a spiral manner to face the horizontal frame 202a, is horizontally moved while in close contact with a side surface of the horizontal frame 202a, and fixes an upper end of the height adjustment unit 300 to the horizontal frame 202a.

The side bolt 301b is inserted into the catching bracket 301 to face the horizontal frame 202a, an end thereof is in close contact with one surface of the horizontal frame 202a, and the upper end of the height adjustment unit 300 is fixed to the horizontal frame 202a.

The side bolt 301b is in close contact with the one surface of the horizontal frame 202a and prevents the upper end of the height adjustment unit 300 from moving.

The support bracket 302 protrudes in a horizontal state and allows the first fixing bolt 302a to be fastened through a lower end thereof.

The support bracket 302 supports a load of the first fixing bolt 302a in close contact with a bottom surface of the horizontal frame 202a and allows a lower end of the height adjustment unit 300 to be fixed to the horizontal frame 202a.

The first fixing bolt 302a is vertically moved, is in close contact with the bottom surface of the horizontal frame 202a, and fixes the lower end of the height adjustment unit 300 to the horizontal frame 202a.

It is preferable that the first fixing bolt 302a is vertically moved manually by a user.

The height adjustment unit 300 includes a pair of vertical movement guide holes 300a formed to be symmetrical at upper and lower ends of one surface thereof and an angle adjustment hole 300b formed to pass through the one surface at a lower end of the vertical movement guide hole 300a in an arcuate shape in a direction perpendicular to the vertical movement guide hole 300a.

The vertical movement guide hole 300a guides a vertical movement guide 402b-1 of the angle adjustment member 402 so that the vertical movement guide 402b-1 is vertically moved to guide the upright movement of a vertical movement plate 402b.

The angle adjustment hole 300b guides an angle adjustment shaft 402a-3 of a rotation plate 402a so that the angle adjustment shaft 402a-3 moves in the front-rear direction.

The angle adjustment device 400 includes a fixing frame 401 which has a single plate shape and is rotatably installed at upper and lower ends of one surface of the height adjustment unit 300 and on which the display D is fixed to a front surface thereof, an angle adjustment member 402 that is vertically moved and rotationally installed at each of upper and lower ends between the fixing frame 401 and the height adjustment unit 300 and adjusts a tilting angle of each of the upper and lower ends of the fixing frame 401, and a vertical movement adjuster 403 that is installed to be connected to the angle adjustment member 402 at the upper and lower ends of the height adjustment unit 300 and forces the vertical movement of the angle adjustment member 402.

It is preferable that the fixing frame 401 is bent from one surface of the height adjustment unit 300 to the front side and the display D is fixed to a front surface of the fixing frame 401.

It is preferable that the upper and lower ends of the fixing frame 401 are rotatably installed in the angle adjustment member 402 and the upper and lower ends of the fixing frame 410 are independently tilted and rotated by the angle adjustment member 402.

The fixing frame 401 is exposed to the front side of the height adjustment unit 300 by the angle adjustment member 402 or enters the height adjustment unit 300 so as to adjust tilting angles of upper and lower ends of the display D.

While the angle adjustment member 402 is rotated and vertically moved, the angle adjustment member 402 adjusts the tilting angles of the upper and lower ends of the fixing frame 401 of the angle adjustment device 400.

While the angle adjustment member 402 is vertically moved by the vertical movement adjuster 403, the angle adjustment member 402 is tilted at a predetermined angle and rotates the upper or lower end of the fixing frame 401 at a predetermined angle.

The angle adjustment member 402 includes the rotation plate 402a and the vertical movement plate 402b that have plate shapes. The angle adjustment member 402 includes a first rotary shaft 402a-1 formed on one surface thereof to be rotatably coupled to the fixing frame 401, a second rotary shaft 402a-2 that is formed to cross the first rotary shaft 402a-1 on the other surface opposite to the first rotary shaft 402a-1 and is rotatably installed on one surface of the height adjustment unit 300, and the angle adjustment shaft 402a-3 that is inserted into the angle adjustment hole 300b at an upper end of the second rotary shaft 402a-2, is moved along the angle adjustment hole 300b, and thus adjusts an angle of the upper end or the lower end of the fixing frame 401. The vertical movement plate 402b includes a fastening hole 402b-4 that is located between the height adjustment unit 300 and the rotation plate 402a and allows fastening of the vertical movement adjuster 403 at an upper end thereof, a vertical movement guide 402b-1 formed on one surface thereof to be inserted into the vertical movement guide hole 300a of the height adjustment unit 300, a diagonal hole 402b-2 that is formed through a lower portion of the vertical movement guide 402b-1 to face a diagonal direction and communicates with the angle adjustment hole 300b to allow the angle adjustment shaft 402a-3 to pass therethrough, and an upright hole 402b-3 that is formed to pass through a lower portion of the diagonal hole 402b-2 in an upright state, passes through the second rotary shaft 402a-2, and is operated to be vertically moved along the second rotary shaft, wherein the vertical movement plate 402b is operated to be vertically moved by the vertical movement adjuster 403 and thus adjusts a rotation angle of the rotation plate 402a.

The first rotary shaft 402a-1 is rotated a predetermined angle forward or rearward by the rotation plate 402a rotated about the second rotary shaft 402a-2 and thus tilts the upper end or the lower end of the fixing frame 401 at a predetermined angle.

The second rotary shaft 402a-2 guides the rotation plate 402a so that the rotation plate 402a is rotated a predetermined angle with respect to the one surface of the height adjustment unit 300, and at the same time, guides the upright hole 402b-3 of the vertical movement plate 402b so that the upright hole 402b-3 is vertically moved.

The angle adjustment shaft 402a-3 is moved in a diagonal direction along the diagonal hole 402b-2 by the vertical movement plate 402b that is vertically moved, and at the same time, is moved in a front-rear direction along the angle adjustment hole 300b of the height adjustment unit 300, thereby adjusting the tilting angle of the rotation plate 402a.

It is preferable that the angle adjustment shaft 402a-3 is guided to the diagonal hole 402b-2 and the angle adjustment hole 300b and moves in the front-rear direction along the angle adjustment hole 300b.

The fastening hole 402b-4 of the vertical movement plate 402b allows the vertical movement adjuster 403 to be fastened in a spiral manner, and the vertical movement plate 402b is vertically moved by the vertical movement adjuster 403.

It is preferable that the fastening hole 402b-4 is formed to pass through an upper surface of a bent surface (unmarked) bent from an upper surface of the vertical movement plate 402b.

The vertical movement guide 402b-1 guides an upper end of the vertical movement plate 402b so that the upper end is vertically moved in an upright state while vertically moved along the vertical movement guide hole 300a of the height adjustment unit 300.

The diagonal hole 402b-2 pushes the angle adjustment shaft 402a-3 in a diagonal direction while vertically moved by the vertical movement plate 402b, and thus guides the angle adjustment shaft 402a-3 so that the angle adjustment shaft 402a-3 moves forward or rearward along the angle adjustment hole 300b.

The upright hole 402b-3 guides a lower end of the vertical movement plate 402b so that the lower end is vertically moved in an upright state while vertically moved along the second rotary shaft 402a-2 of the rotation plate 402a.

The above-described display panel fixing apparatus according to the present disclosure is used as follows.

In the following description, an example in which the base frame 100 is fixedly installed on a structure (not illustrated), and the description in which the gap adjustment unit 200 is installed on the front surface of the base frame 100 is omitted, and a state in which the angle adjustment device 400 is coupled to and installed on the height adjustment unit 300 will be described.

First, the pair of angle adjustment devices 400 are provided to be symmetrical, a rear surface of the display D is in close contact with the front surface of the fixing frame 401 of the angle adjustment device 400, and the angle adjustment device 400 is then fixed to the rear surface of the display D.

In this case, the fixing frame 401 of the angle adjustment device 400 is formed to be bent, the display D is fixed to the front surface of the fixing frame 401, and a side surface of the fixing frame 401 is to be tilted and coupled to the one surface of the height adjustment unit 300 by the angle adjustment member 402.

Further, the height adjustment unit 300 connected to and installed on the angle adjustment device 400 is located in front of the gap adjustment unit 200. In this state, the catching bracket 301 of the height adjustment unit 300 is caught by and fixed to the upper end of the horizontal frame 202*a* of the gap adjustment unit 200, and thus the support bracket 302 is located at the lower end of the horizontal frame 202*a*.

Thereafter, when the height adjustment bolt 301*a* and the side bolt 301*b* installed on the catching bracket 301 and the first fixing bolt 302*a* are tightened, the end of the height adjustment bolt 301*a* is in close contact with the upper end of the horizontal frame 202*a*, the side bolt 301*b* is in close contact with a side surface of the upper end of the horizontal frame 202*a*, the upper end of the height adjustment unit 300 is fixed in close contact with the horizontal frame 202*a*, the end of the side bolt 301*b* is in close contact with the lower end of the horizontal frame 202*a*, and thus the lower end of the height adjustment unit 300 is fixed in close contact with the horizontal frame 202*a*.

In this case, for finely adjusting the height of the display D fixedly installed on the angle adjustment device 400, a user rotates the height adjustment bolt 301*a* installed on an upper surface of the catching bracket 301 so that the height of the height adjustment bolt 301*a* exposed below the catching bracket 301 is adjusted, and thus a separation distance from the horizontal frame 202*a* to the height adjustment unit 300 is adjusted in proportion to the height of the height adjustment hole 301*a* exposed below the catching bracket 301, and the height of the display D installed on the angle adjustment device 400 is adjusted.

Here, when the height of the display D is adjusted by adjusting the height adjustment bolt 301*a*, in a state in which fixing of the first fixing bolt 302*a* and the side bolt 301*b* is released, after the height of the display D is finely adjusted, the first fixing bolt 302*a* and the side bolt 301*b* are tightened and fixed, and thus the height adjustment unit 300 is fixed to the horizontal frame 202*a*.

Further, when the catching bracket 301 of the height adjustment unit 300 is coupled to the horizontal frame 202*a*, the driving ball 301*a*-1 of the height adjustment bolt 301*a* is in close contact with the upper end of the horizontal frame 202*a*, and in this case, as the display D is moved in a left-right direction, the driving ball 301*a*-1 is rotated in place while rubbing against the upper end of the horizontal frame 202*a*, and thus, the display D may move in the left-right direction.

Further, for adjusting tilting angles of an upper end and a lower end of the display D installed on the angle adjustment device 400, a user grips the vertical movement adjuster 403, and in this state, the vertical movement adjuster 403 is rotated to vertically move the vertical movement plate 402*b* connected to the vertical movement adjuster 403.

In this case, the vertical movement adjuster 403 is fastened to the fastening hole 402*b*-4 of the vertical movement plate 402*b* in a spiral manner, and the fastening hole 402*b*-4 vertically moves the vertical movement plate 402*b* while being forcibly vertically moved by the vertical movement adjuster 403.

Here, the vertical movement guide 402*b*-1 of the vertical movement plate 402*b* is vertically moved along the vertical movement guide hole 300*a* of the height adjustment unit 300 and guides the upper end of the vertical movement plate 402*b* so that the upper end is vertically moved, and the upright hole 402*b*-3 is vertically moved along the second rotary shaft 402*a*-2 of the rotation plate 402 and guides the lower end of the vertical movement plate 402*b* so that the lower end is vertically moved.

Figure 9:
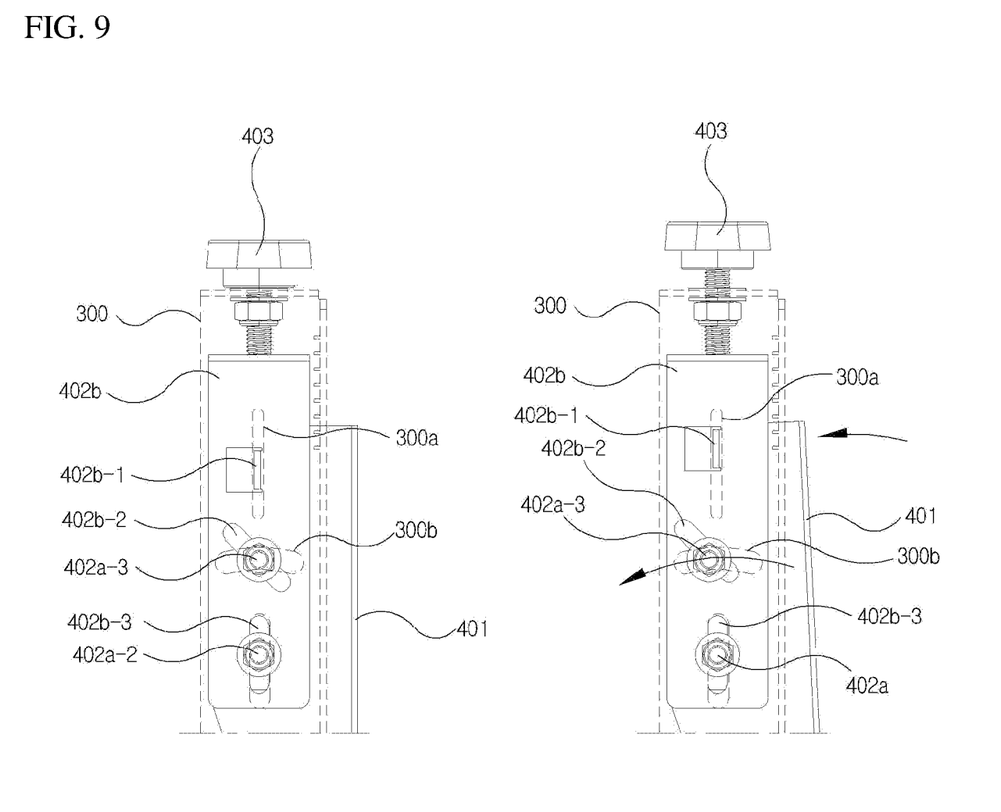
FIG. 9 is a side view illustrating a state in which the angle adjustment device of the display panel fixing apparatus according to the present disclosure is rotatably operated.

Then, while the vertical movement plate 402*b* is vertically moved, the angle adjustment shaft 402*a*-3 of the rotation plate 402*a* is moved along the diagonal hole 402*b*-2 and the angle adjustment hole 300*b* of the height adjustment unit 300, the rotation plate 402*a* is rotated about the second rotary shaft 402*a*-2 by the angle adjustment shaft 402*a*-3, and thus the first rotary shaft 402*a*-1 is tilted at a predetermined angle.

In this case, the upper end or the lower end of the fixing frame 401 connected to the first rotary shaft 402*a*-1 is exposed forward by the rotation plate 402*a* or is rotated rearward to enter the height adjustment unit 300, and thus tilting angles of the upper end and the lower end of the display D are individually adjusted.

Figure 5:
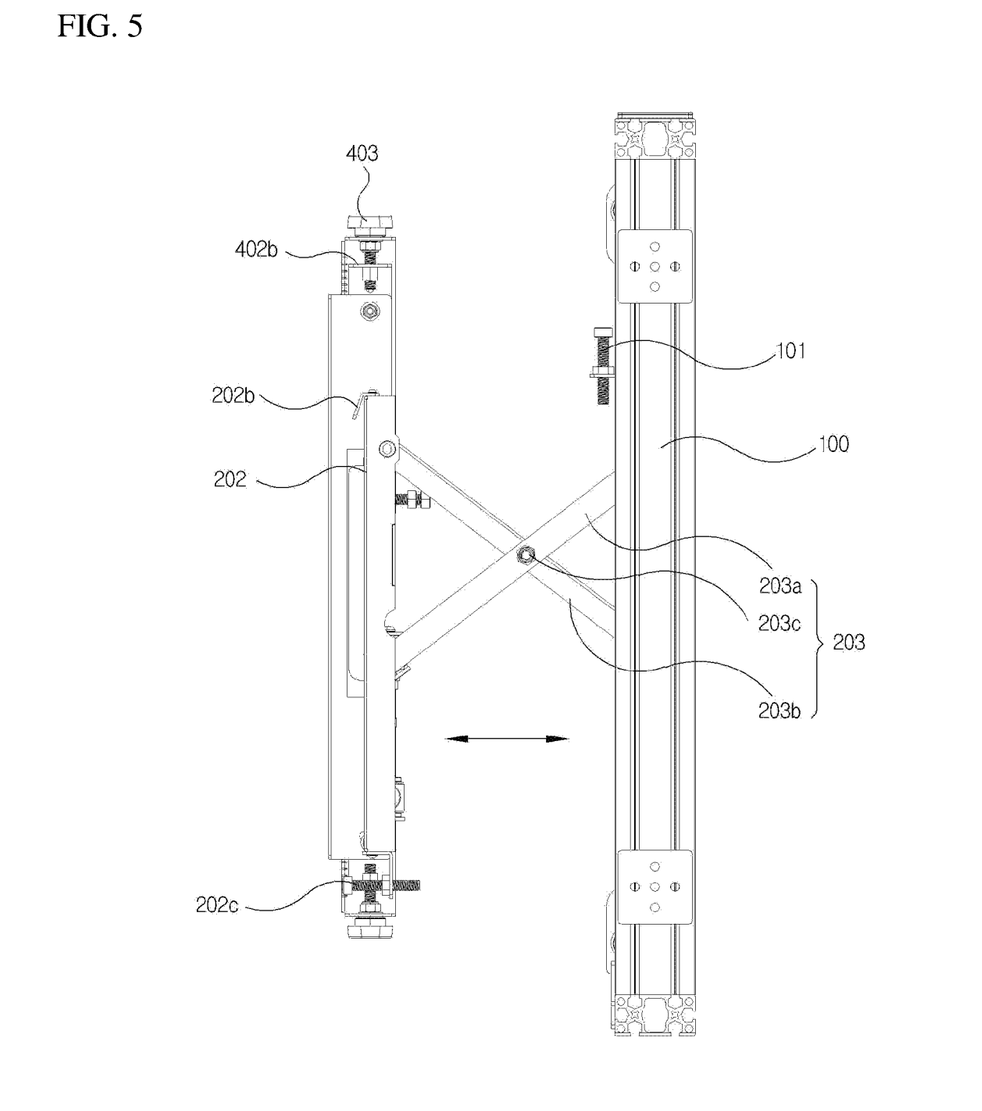
FIGS. 5 and 6 are side views illustrating a state in which the gap adjustment unit of the display panel fixing apparatus according to the present disclosure is operated.
Figure 6:
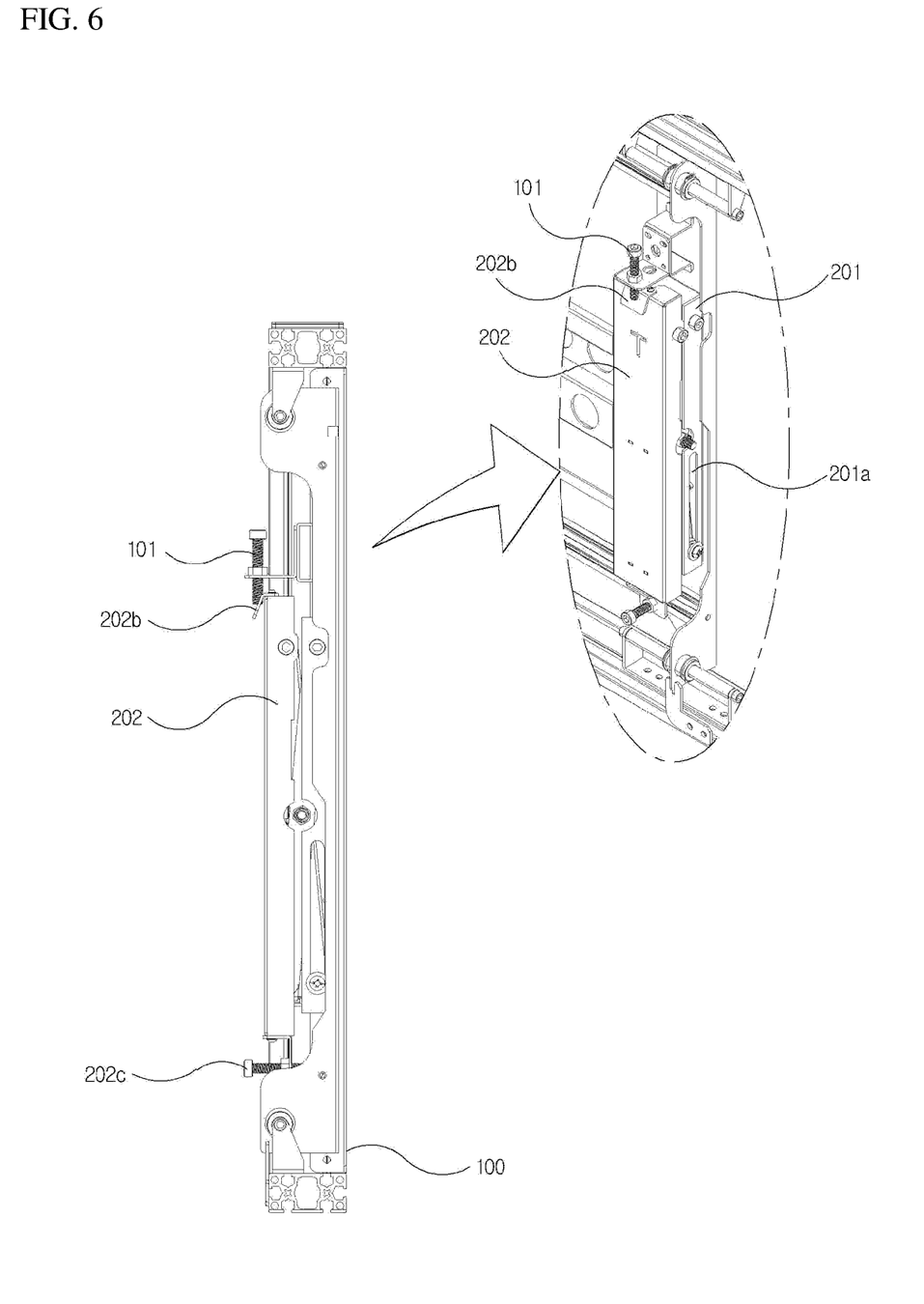

Meanwhile, for allowing the display D fixedly installed on the angle adjustment device 400 to approach the base frame 100 or to be spaced a predetermined distance from the base frame 100, a user grips the second support frame 202 of the gap adjustment unit 200, and in this state, when the second support frame 202 is forcibly moved in a direction of the first support frame 201 or a direction opposite to the first support frame 201, the link 203 is folded or unfolded, and thus the distance between the links 203 is adjusted.

That is, when the second support frame 202 is forcibly moved, the other end of the first link 203*a* of the link 203 is vertically moved by the adjustment member 204, and the connecting rod 203*b*-1 connecting the other end of the second link 203*b* is vertically moved along the long hole 201*a* of the first support frame 201. Then, as the central portions of the first and second links 203*a* and 203*b* are rotated about the rotary shaft 203*c*, the link 203 is folded or unfolded, and thus the folding gap of the link 203 is adjusted.

Here, the adjustment member 204 includes a vertical movement rod 204*a* protruding from the bottom surface of the second support frame 202 in an upright state and a vertical movement block 204*b* that is slidably coupled to the vertical movement rod 204*a* and is vertically moved. Accordingly, the other end of the first link 203*a* is rotatably coupled to the vertical movement block 204*b*, and thus the other end of the first link 203*a* is vertically moved by the vertical movement block 204*b* and is rotated about the rotary shaft 203*c*.

Further, while the second support frame 202 is moved in a direction of the first support frame 201 or a direction opposite thereto in proportion to the folding gap between the links 203, the angle adjustment device 400 is moved, and thus a separation distance between the display D and the base frame 100 is adjusted.

Here, the distance limitation bolt 202*c* is formed at the lower end of the second support frame 202, and when the exposure length of the distance limitation bolt 202*c* exposed to the rear end of the second support frame 202 is adjusted through rotation of the distance limitation bolt 202*c*, an end of the distance limitation bolt 202*c* is in close contact with the base frame 100, and thus, the second support frame 202 is prevented from approaching the first support frame 201 within a predetermined distance.

In order for fixing the second support frame 202 in close contact with the first support frame 201, the second support frame 202 is brought into close contact with the first support frame 201. In this state, when the second fixing bolt 101 is rotated to push and press the inclination bracket 202*b* formed in the second support frame 202 using the second fixing bolt 101, the inclination bracket 202*b* is pushed and pressed in the direction of the first support frame 201, the second support frame 202 is fixed to the first support frame 201 in a close contact state, and thus the second support frame 202 is prevented from moving.

In this case, it is preferable that, when the inclination bracket 202*b* is pushed and pressed by the second fixing bolt 101, the distance limitation bolt 202*c* exposed at the rear side of the second support frame 202 is adjusted, and thus the end of the distance limitation bolt 202*c* is maintained in a state of being spaced apart from the base frame 100.

As described above, in a structure in which angles of the upper and lower ends of the fixing frame 401 are adjusted using the angle adjustment member 402 of the angle adjustment device 400 to finely adjust the tilting angles of the upper and lower ends of the display D, the angle adjustment members 402 of the angle adjustment device 400 are installed at the upper and lower ends of the fixing frame 401, and thus the tilting angles of the upper and lower ends of the fixing frame 401 can be adjusted using these angle adjustment members 402. Since the angles of the upper and lower ends of the fixing frame 401 are individually adjusted, an unskilled person can easily adjust the separation distance, height, and angles of the upper and lower ends of the display D in the structure (not illustrated). Since the tilting angles of the upper and lower ends of the fixing frame 401 are individually adjusted, the angles of the upper and lower ends of the display D installed on the fixing frame 401 can be finely adjusted. When the tilting angle of one of the upper end and the lower end of the fixing frame 401 is adjusted, there is no change in the angle of the other one thereof, and thus the tilting angles of the upper end or the lower end of the fixing frame 401 can be easily adjusted.

According to the present disclosure, angle adjustment members of angle adjustment devices are installed at upper and lower ends of a fixing frame, and thus tilting angles of the upper and lower ends of the fixing frame can be adjusted using the angle adjustment members. Angles of the upper and lower ends of the fixing frame are individually adjusted, and thus an unskilled person can easily adjust a separation distance, a height, and angles of upper and lower ends of a display on a structure. The tilting angles of the upper and lower ends of the fixing frame are individually adjusted, and thus the angles of the upper and lower ends of the display installed on the fixing frame can be finely adjusted. When the tilting angle of one of the upper end and the lower end of the fixing frame is adjusted, the angle of the other one of the upper end and the lower end is not changed, and thus the tilting angle of the upper end or the lower end of the fixing frame can be easily adjusted. Accordingly, the separation, height, and angles of the upper and lower ends of the display can be easily adjusted, and thus work efficiency is improved, and at the same time, the reliability of a product is improved.

The display panel fixing apparatus according to the present disclosure as described above is not limited to the above embodiments, and those skilled in the art to which the present disclosure pertains can variously modify the present disclosure without departing from the subject matter of the present disclosure as described in the appended claims.

What is claimed is:

1. A display panel fixing apparatus comprising:
   a base frame (100) fixedly installed on a structure;
   a gap adjustment unit (200) including a pair of first support frames (201) that are symmetrical on both sides of a front surface of the base frame (100), a pair of second support frames (202) that are formed at a front side opposite to the first support frames (201) to correspond to the first support frames (201) and are connected by a horizontal frame (202*a*), links (203) that are formed between the first support frames (201) and the second frames (202) in an X shape to be foldable and adjust a separation distance between the first support frames (201) and the second support frames (202), and adjustment members (204) that are connected to the links (203) at lower ends of the second support frames (202) and are vertically moved to adjust a folding gap between the links (203);
   a height adjustment unit (300) having a plate shape and including a catching bracket (301) formed on one surface thereof to be caught on and fixed to an upper end of the horizontal frame (202*a*), a support bracket (302) that supports a lower end of the horizontal frame (202*a*) below the catching bracket (301), a height adjustment bolt (301*a*) that is fastened through an upper end of the catching bracket (301) and is in close contact with the upper end of the horizontal frame (202*a*), and a first fixing bolt (302*a*) that is fastened through a lower end of the support bracket (302) and is in close contact with the lower end of the horizontal frame (202*a*); and
   an angle adjustment device (400) having a single plate shape and including a fixing frame (401) that is rotatably installed at upper and lower ends of one surface of the height adjustment unit (300) and fixes a display (D) to a front surface thereof, angle adjustment members (402) that are vertically moved and rotatably installed at upper and lower ends between the fixing frame (401) and the height adjustment unit (300) and adjust tilting angles of the upper and lower ends of the fixing frame (401), and vertical movement adjusters (403) that are installed to be connected to the angle adjustment members (402) at upper and lower ends of the height adjustment unit (300) and force vertical movement of the angle adjustment member (402).

2. The display panel fixing apparatus of claim 1, wherein the gap adjustment unit (200) includes long holes (201*a*) which extend to be long and pass through facing inner wall surfaces of lower ends of the first support frame (201) in a longitudinal direction, and
   the links (203) include:
   a first link (203*a*) that has one end rotatably installed at an upper end of the first support frame (201) and the other end rotatably installed at the adjustment member (204) and pulls or pushes the second support frame (202) while rotating about a central portion through the adjustment member (204) that is vertically moved;
   a second link (203*b*) that has one end rotatably installed at an upper end of the second support frame (202), extends to be long between the one end and the other end in a longitudinal direction, is connected by a connecting rod (203*b*-1) slidably coupled to the long hole (201*a*), and pulls or pushes the second support frame (202) while rotating about a central portion by the connecting rod (203*b*-1) that is operated to be vertically moved along the long hole (201*a*); and a rotary shaft (203*c*) that is fastened to pass through central portions of the first link (203*a*) and the second link (203*b*) and guides the first link (203*a*) and the second link (203*b*) so that the first link (203*a*) and the second link (203*b*) are rotated about the central portions.

3. The display panel fixing apparatus of claim 1, wherein the adjustment member (204) of the gap adjustment unit (200) includes:

a vertical movement rod (204*a*) formed at a lower end of the second support frame (202) in an upright state; and a vertical movement block (204*b*) that is slidably coupled to the vertical movement rod (204*a*) and is vertically moved along the vertical movement rod (204*a*) to adjust a folding gap of the link (203).

4. The display panel fixing apparatus of claim 1, wherein the base frame (100) further includes a pair of second fixing bolts (101) that are fixedly installed to be symmetrical on both sides of the front surface of the base frame (100) to be located above the first support frame (201), are fastened in an upright state to be vertically movable in a spiral manner, and are vertically moved, and the second support frame (202) further includes an inclination bracket (202*b*) that extends downward from an upper end toward a front surface thereof and is pressed by the second fixing bolts (101) to fix the second support frame (202) to the first support frame (201).

5. The display panel fixing apparatus of claim 1, wherein the second support frame (202) of the gap adjustment unit (200) further includes a distance limitation bolt (202*c*) that is fastened to a lower end thereof in a spiral manner in a horizontal state to face the base frame (100), is operated in a front-rear direction so that an end thereof is in close contact with the front surface of the base frame (100), and prevents the second support frame (202) from approaching within a predetermined distance or less from the first support frame (201).

6. The display panel fixing apparatus of claim 1, wherein the height adjustment unit (300) further includes a side bolt (301*b*) that is fastened to one surface of the catching bracket (301) perpendicular to the height adjustment bolt (301*a*) in a spiral manner to face the horizontal frame (202*a*), is horizontally moved in close contact with a side surface of the horizontal frame (202*a*), and fixes an upper end of the height adjustment unit (300) to the horizontal frame (202*a*), and the first fixing bolt (302*a*) is vertically moved, is in close contact with a bottom surface of the horizontal frame (202*a*), and fixes a lower end of the height adjustment unit (300) to the horizontal frame (202*a*).

7. The display panel fixing apparatus of claim 1, wherein the height adjustment bolt (301*a*) is vertically moved, is in close contact with an upper surface of the horizontal frame (202*a*), and adjusts a height so that the height adjustment unit (300) is spaced a predetermined distance from an upper portion of the horizontal frame (202*a*), and further includes a driving ball (301*a*-1) that is in close contact with the upper surface of the horizontal frame (202*a*) at an end thereof and guides the height adjustment unit (300) so that the height adjustment unit (300) slides in a longitudinal direction of the horizontal frame (202*a*).

8. The display panel fixing apparatus of claim 1, wherein the height adjustment unit (300) includes a pair of vertical movement guide holes (300*a*) formed to be symmetrical at upper and lower ends of one surface thereof and an angle adjustment hole (300*b*) formed to pass through the one surface at a lower end of the vertical movement guide hole (300*a*) in an arcuate shape in a direction perpendicular to the vertical movement guide hole (300*a*), and the angle adjustment member (402) includes:

a rotation plate (402*a*) that has a plate shape and includes a first rotary shaft (402*a*-1) formed on one surface thereof to be rotatably connected to the fixing frame (401), a second rotary shaft (402*a*-2) that is formed to cross the first rotary shaft (402*a*-1) on the other surface opposite to the first rotary shaft (402*a*-1) and is rotatably installed on one surface of the height adjustment unit (300), and an angle adjustment shaft (402*a*-3) that is inserted into the angle adjustment hole (300*b*) at an upper end of the second rotary shaft (402*a*-2), is moved along the angle adjustment hole (300*b*), and adjusts an angle of an upper end or a lower end of the fixing frame (401); and a vertical movement plate (402*b*) that has a plate shape and includes a fastening hole (402*b*-4) that is located between the height adjustment unit (300) and the rotation plate (402*a*) and allows fastening of the vertical movement adjuster (403) at an upper end thereof, a vertical movement guide (402*b*-1) formed on one surface thereof to be inserted into the vertical movement guide hole 300*a* of the height adjustment unit (300), a diagonal hole (402*b*-2) that is formed to pass through a lower portion of the vertical movement guide (402*b*-1) toward a diagonal direction and communicates with the angle adjustment hole (300*b*) to allow the angle adjustment shaft (402*a*-3) to pass therethrough, and an upright hole (402*b*-3) that is formed to pass through a lower portion of the diagonal hole (402*b*-2) in an upright state, allows the second rotary shaft (402*a*-2) to pass therethrough, and is operated to be vertically moved along the second rotary shaft (402*a*-2), wherein the vertical movement plate (402*b*) is vertically moved by the vertical movement adjuster (403) to adjust a rotation angle of the rotation plate (402*a*).

* * * * *